Jan. 12, 1960 J. N. STREET ET AL 2,921,126

RECORD APPARATUS

Filed July 7, 1955

INVENTORS
JOHN N. STREET
WILLIAM F. HAMILTON
BY Raymond Wolton
ATTORNEY

United States Patent Office 2,921,126

Patented Jan. 12, 1960

2,921,126

RECORD APPARATUS

John N. Street, Washington, D.C., and William F. Hamilton, Rockville, Md., assignors to Reed Research, Inc., Washington, D.C., a corporation of Delaware Application July 7, 1955, Serial No. 520,457

2 Claims. (Cl. 178—6.6)

Figure 1:
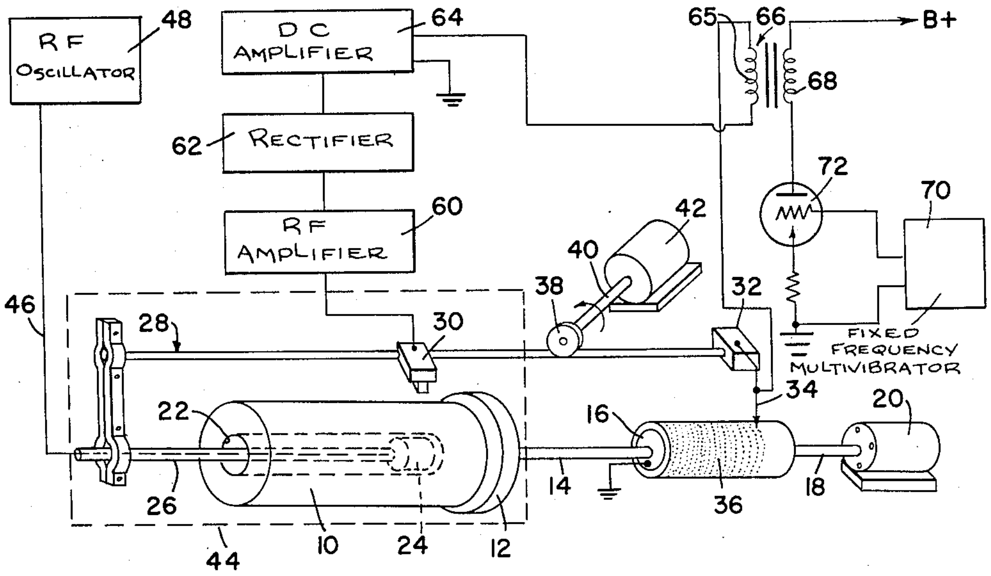

This invention relates to record apparatus wherein the amplitude of a signal will be represented as a density variation on a record medium.

In a preferred embodiment, whenever a signal exceeds a predetermined threshold value, its amplitude will be represented by markings on a record in the form of markings whose density will be a function of the signal amplitude.

It is among the objects of the present invention to provide record apparatus for providing a record of the density of an object, the visual characteristics of each portion of said record being a function of the density of corresponding portions of said object, comprising a work support for supporting said object, a record support for supporting a record surface, a signal source, a transmitting transducer for receiving pulses from said signal source and in response thereto transmitting sonic energy pulses through said object, a carriage supporting said transmitting transducer and a signal responsive transducer in fixed spatial relation to each other on opposite sides of a portion of said object, said transmitting transducer having a relatively small signal producing surface for producing pulses of sonic energy which travel away from said signal producing surface for passage through said object in substantially spherical waves, said pulses being modulated in accordance with the density of said object, said signal responsive transducer intersecting said spherical waves over a relatively small angle with respect to said signal producing surface and being responsive to said pulses of sonic energy transmitted through said object in the thin beam defined by said relatively small angle for producing output signals which are modulated in accordance with the density of the object in the region through which said pulses have passed, a stylus mounted on said carriage, driving means for imparting similar motions to said work and record supports in one direction and similar motions to said carriage, transmitting transducer, signal responsive transducer and stylus in another direction to scan said object with said beam and to similarly scan said record surface with said stylus, a circuit coupled to said signal responsive transducer for receiving the modulated signals therefrom and transferring them to said stylus for producing modulated electrical discharges between said stylus and said record support, which discharges produce on said record surface a pattern of visible marks whose visual characteristics vary in accordance with the modulations of said modulated signals.

The driving means may impart rotary motions to the work and record supports and rectilinear motion to the carriage. The signal source preferably comprises a transmitting transducer spaced from the signal responsive transducer to receive a work piece between them for inspection, the sensing circuit transducer preferably being fed by an amplifier to supply the stylus with sufficient energy to produce an intelligible record. An ultrasonic pulse generator may supply the transmitting transducer with a suitable frequency. A rectifier may be interposed between the signal responsive transducer and the stylus to supply the stylus with direct current, and the sonic frequency source in the form of a multivibrator may be inductively coupled with the signal responsive transducer and stylus circuit. Moreover, the frequency of the multivibrator may be constant.

Figure 2:
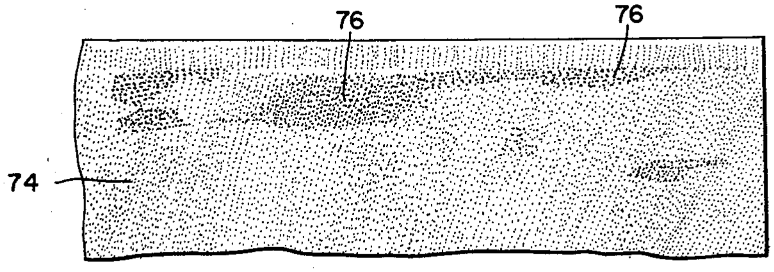

Whereas the invention is applicable to the testing of a wide variety of forms and materials with different types of signal sources and transducers, it has been illustrated as applied to the detection of cracks and porous regions in hollow cylindrical propellant grains in the accompanying drawing wherein:

Fig. 1 is a diagrammatic showing of one form of apparatus and circuit contemplated; and Fig. 2 is a fragmentary representation of a record produced therewith.

A work piece 10 is suitably carried by a work support 12 coupled by means of a shaft 14 with a recorder drum 16 adapted for rotation through a shaft 18 by a driving motor 20.

The work piece 10 is shown as a hollow cylinder whose axial opening 22 receives a signal transmitting transducer 24 mounted on a rod or tube 26 forming part of a carriage 28 which supports another transducer 30 supported externally of the work piece for sensing signals from the transmitting transducer 24, and a stylus assembly 32 carrying a stylus 34 for cooperation with a record sheet 36 mounted on the drum 16. Rectilinear movement is imparted to the carriage, its transducers and stylus assembly by means of a friction wheel or gear 38 secured to the shaft 40 of a motor 42, the relative speeds of movement and dimensions of the record drum determining the spacing or interval between adjacent paths generated by movement of the stylus relative to the drum.

The transducers 24 and 30 as well as the work piece 10 are immersed in a liquid such as water, diagrammatically represented by the broken line enclosure 44 to provide a low loss coupling for the ultrasonic frequency oscillations utilized in operating the equipment.

An ultrasonic pulse generator or radio frequency oscillator 48 drives the transducer 24 through a suitable number of conductors 46. The receiving transducer 30 converts the transmitted sound pressures to electrical signals which are supplied to the radio frequency amplifier 60 whose output is fed to a rectifier 62 which supplies direct current to a direct current amplifier 64 whose output is proportional to the amplitude of the signals transmitted through the work piece 10. The output of the amplifier 64 is connected in series with the secondary ground return lead of the secondary 65 of an impedance matching transformer 66 whose primary 68 is fed with short duration high voltage pulses at a recurrence rate of several hundred per second from a multivibrator 70, constituting a sonic frequency source, through a vacuum tube 72. As illustrated, the multivibrator 70 has a fixed frequency which will determine the pattern of dots or marks applied to the record, their size varying as a function of the direct current component supplied by the amplifier 64. If desired the output of the amplifier could control the frequency of a variable frequency multivibrator to produce a record pattern having a dot frequency varying as a function of the amplitude of the signals sensed by the transducer 30.

The degree of darkening of the record sheet 36, which may be an electro-sensitive medium such as "Teledeltos" paper, is a function of the stylus voltage which is in turn dependent upon the instantaneous writing pulse voltage supplied from the multivibrator plus the output voltage of the D.C. amplifier 64. It will be noted, as compared with the method of recording X-ray film exposures, that by electrically displacing the zero position of the output of the D.C. amplifier 64, it is possible to produce images on the record sheet which are either black on white or white on black.

Reference to Fig. 2, depicting a record produced with the present apparatus, will indicate the ranges of density or intensity of markings produced. The more homogeneous portions of low intensity are typified by the zone 74 indicating low signal transmission in the present case, while the darker zones 76 of greater intensity or density indicate regions of high signal amplitudes.

It will follow that since the movements of the work piece and the record drum are similar and the movements of the transducers and stylus are likewise similar, a very accurate representation of the composition of the work piece will be produced on the record sheet 36 which can be removed from the drum 16 in either its cylindrical form or peeled therefrom as a sheet to constitute a permanent record of the characteristics of the article undergoing inspection.

Whereas only one specific form of the invention has been illustrated and described, other variations are contemplated as falling within the scope of the appended claims.

We claim:

1. Record apparatus for providing a record of the density of an object, the visual characteristics of each portion of said record being a function of the density of corresponding portions of said object, comprising a work support for supporting said object, a record support for supporting a record surface, a signal source, a transmitting transducer for receiving pulses from said signal source and in response thereto transmitting sonic energy pulses through said object, a carriage supporting said transmitting transducer and a signal responsive transducer in fixed spatial relation to each other on opposite sides of a portion of said object, said transmitting transducer having a relatively small signal producing surface for producing pulses of sonic energy which travel away from said signal producing surface for passage through said object in substantially spherical waves, said pulses being modulated in accordance with the density of said object, said signal responsive transducer intersecting said spherical waves over a relatively small angle with respect to said signal producing surface and being responsive to said pulses of sonic energy transmitted through said object in the thin beam defined by said relatively small angle for producing output signals which are modulated in accordance with the density of the object in the region through which said pulses have passed, a stylus mounted on said carriage, driving means for imparting similar motions to said work and record supports in one direction and similar motions to said carriage, transmitting transducer, signal responsive transducer and stylus in another direction to scan said object with said beam and to similarly scan said record surface with said stylus, a circuit coupled to said signal responsive transducer for receiving the modulated signals therefrom and transferring them to said stylus for producing modulated electrical discharges between said stylus and said record support, which discharges produce on said record surface a pattern of visible marks whose visual characteristics vary in accordance with the modulations of said modulated signals.

2. Record apparatus as set forth in claim 1 wherein said record surface is the same geometrical configuration as the external surface of said object.

References Cited in the file of this patent

UNITED STATES PATENTS

| | | |
|---|---|---|
| 2,524,208 | Piper | Oct. 3, 1950 |
| 2,572,550 | White | Oct. 23, 1951 |
| 2,587,414 | Valkenburg | Feb. 26, 1952 |
| 2,705,259 | Lant | Mar. 29, 1955 |
| 2,862,384 | Renaut | Dec. 2, 1958 |